(12) United States Patent
Dellacona

(10) Patent No.: US 7,263,476 B1
(45) Date of Patent: Aug. 28, 2007

(54) HIGH SPEED INFORMATION PROCESSING AND MASS STORAGE SYSTEM AND METHOD, PARTICULARLY FOR INFORMATION AND APPLICATION SERVERS

(75) Inventor: Richard Dellacona, Riverside, CA (US)

(73) Assignee: Quad Research, Newport Beach, CA (US)

(*) Notice: Subject to any disclaimer, the term of this patent is extended or adjusted under 35 U.S.C. 154(b) by 848 days.

(21) Appl. No.: 09/592,572

(22) Filed: Jun. 12, 2000

(51) Int. Cl.
*G06F 17/50* (2006.01)
(52) U.S. Cl. .......................... 703/13; 710/38; 370/258; 340/507; 398/5; 711/112; 711/200
(58) Field of Classification Search ............... 703/27, 703/13; 711/14, 114, 154, 207, 1, 112, 200; 712/11; 708/517, 320; 714/48, 64, 4, 5; 710/38, 315; 370/455, 258, 222; 600/508; 398/5; 361/684, 695; 340/507
See application file for complete search history.

(56) References Cited

U.S. PATENT DOCUMENTS

| | | | |
|---|---|---|---|
| 4,347,563 A | 8/1982 | Paredes et al. ............. 700/8 |
| 4,590,554 A | 5/1986 | Glazer et al. ............. 714/13 |
| 4,710,926 A | 12/1987 | Brown et al. ............. 714/4 |
| 4,773,313 A | 9/1988 | Anson ............. 99/279 |
| 4,819,159 A | 4/1989 | Shipley et al. ............. 714/19 |
| 4,871,324 A | 10/1989 | Brune et al. ............. 438/189 |
| 5,005,122 A | 4/1991 | Griffin et al. ............. 709/203 |
| 5,134,619 A | 7/1992 | Henson et al. ............. 714/770 |
| 5,140,689 A | 8/1992 | Kobayashi ............. 714/20 |
| 5,151,989 A | 9/1992 | Johnson et al. ............. 707/10 |
| 5,155,729 A | 10/1992 | Rysko et al. ............. 714/11 |
| 5,157,663 A | 10/1992 | Major et al. ............. 714/10 |
| 5,157,771 A | 10/1992 | Losi et al. ............. 710/302 |
| 5,185,693 A | 2/1993 | Loftis et al. ............. 700/82 |
| 5,210,855 A | 5/1993 | Bartol ............. 710/302 |

(Continued)

FOREIGN PATENT DOCUMENTS

EP 0 467 079 A 1/1992

(Continued)

OTHER PUBLICATIONS

R.W. Kembel, "In-Depth Fibre Channel Arbitration Loop", Northwest Learning Associates For Solution Technology, 1996, pp. 269-281.

*Primary Examiner*—Paul Rodriguez
*Assistant Examiner*—Kandasamy Thangavelu
(74) *Attorney, Agent, or Firm*—Fulwider Patton LLP

(57) ABSTRACT

A high speed, microcomputer based, Fibre Channel compatible and fault tolerant information processing and mass storage system especially suited for information servers and application servers. A unique and extremely versatile system architecture, including a dual loop arbitrated, Fibre Channel capable, multiple-fault tolerant, hot-swappable mass storage disk array, permits combinations of servers and mass storage arrays which can be tailored for a wide variety of applications and which can be configured with emphasis on the system characteristics such as redundancy, speed, processing capability, storage capability, and the like, as desired. A unique backplane and/or midplane arrangement for connecting the system components allows for easy and, in most cases, on-line field upgrading and/or service and at the same time provides for the very effective cooling of components, particularly those such as disk drives which tend to produce a lot of heat.

31 Claims, 9 Drawing Sheets

U.S. PATENT DOCUMENTS

| | | | |
|---|---|---|---|
| 5,210,866 A | 5/1993 | Milligan et al. ............... 714/6 |
| 5,218,697 A | 6/1993 | Chung ....................... 709/230 |
| 5,227,778 A | 7/1993 | Vacon et al. ........... 340/825.52 |
| 5,249,293 A | 9/1993 | Schreiber et al. ........... 709/203 |
| 5,255,367 A | 10/1993 | Bruckert et al. .............. 714/11 |
| 5,265,098 A | 11/1993 | Mattson et al. ................ 714/6 |
| 5,271,013 A | 12/1993 | Gleeson ....................... 714/10 |
| 5,277,615 A | 1/1994 | Hastings et al. ............ 439/377 |
| 5,287,461 A | 2/1994 | Moore ...................... 709/219 |
| 5,297,067 A | 3/1994 | Blackborow et al. ....... 710/305 |
| 5,311,873 A * | 5/1994 | Savard et al. ............... 600/508 |
| 5,343,358 A | 8/1994 | Hilbrink ..................... 361/700 |
| 5,343,477 A | 8/1994 | Yamada ........................ 714/4 |
| 5,369,757 A | 11/1994 | Spiro et al. ................... 714/19 |
| 5,386,567 A | 1/1995 | Lien et al. .................. 713/100 |
| 5,390,326 A | 2/1995 | Shah .......................... 370/222 |
| 5,394,526 A | 2/1995 | Crouse et al. .............. 709/219 |
| 5,408,649 A | 4/1995 | Beshears et al. ............. 714/10 |
| 5,410,691 A | 4/1995 | Taylor ........................ 707/100 |
| 5,412,723 A | 5/1995 | Canetti et al. .............. 713/155 |
| 5,414,591 A * | 5/1995 | Kimura et al. .............. 361/695 |
| 5,423,042 A | 6/1995 | Jalili et al. .................. 719/328 |
| 5,430,876 A | 7/1995 | Schreiber et al. ........... 719/328 |
| 5,434,994 A | 7/1995 | Shaheen et al. ............ 709/223 |
| 5,442,749 A | 8/1995 | Northcutt et al. ........... 709/219 |
| 5,446,736 A | 8/1995 | Gleeson et al. ............. 710/308 |
| 5,450,578 A | 9/1995 | Mackenthun .................. 714/4 |
| 5,450,583 A | 9/1995 | Inada .......................... 719/315 |
| 5,452,448 A | 9/1995 | Sakuraba et al. ........... 707/201 |
| 5,454,080 A | 9/1995 | Fasig et al. ................. 710/302 |
| 5,455,953 A | 10/1995 | Russell ....................... 710/266 |
| 5,459,863 A | 10/1995 | Taylor ........................ 707/10 |
| 5,471,099 A | 11/1995 | Larabell et al. ............... 307/53 |
| 5,471,634 A | 11/1995 | Giorgio et al. ............. 707/104 |
| 5,475,813 A | 12/1995 | Cieslak et al. ................. 714/4 |
| 5,479,653 A | 12/1995 | Jones ........................... 714/5 |
| 5,488,716 A | 1/1996 | Schneider et al. ............ 714/10 |
| 5,502,836 A | 3/1996 | Hale et al. .................. 711/170 |
| 5,504,882 A | 4/1996 | Chai et al. ...................... 714/5 |
| 5,513,314 A | 4/1996 | Kandasamy et al. ........... 714/6 |
| 5,517,632 A | 5/1996 | Matsumoto et al. ......... 711/14 |
| 5,518,418 A | 5/1996 | Larabell ..................... 439/505 |
| 5,522,031 A | 5/1996 | Ellis et al. ..................... 714/6 |
| 5,530,905 A | 6/1996 | Nichols et al. ............. 709/227 |
| 5,537,642 A | 7/1996 | Glowny et al. ............. 713/200 |
| 5,542,087 A | 7/1996 | Neimat et al. ................ 707/10 |
| 5,544,339 A | 8/1996 | Baba ........................... 711/114 |
| 5,546,583 A | 8/1996 | Shriver ....................... 719/313 |
| 5,548,711 A * | 8/1996 | Brant et al. .................... 714/5 |
| 5,548,712 A | 8/1996 | Larson et al. .................. 714/7 |
| 5,548,724 A | 8/1996 | Akizawa et al. ............ 709/203 |
| 5,564,040 A | 10/1996 | Kabala ....................... 711/173 |
| 5,566,297 A | 10/1996 | Devarakonda et al. ......... 714/5 |
| 5,579,222 A | 11/1996 | Bains et al. ................ 717/167 |
| 5,579,491 A | 11/1996 | Jeffries et al. .............. 710/302 |
| 5,581,552 A | 12/1996 | Civanlar et al. ............ 370/396 |
| 5,592,611 A | 1/1997 | Midgely et al. ............... 714/4 |
| 5,600,644 A | 2/1997 | Chang et al. ............... 370/404 |
| 5,602,852 A * | 2/1997 | Shiobara ..................... 370/455 |
| 5,603,029 A | 2/1997 | Aman et al. ................ 718/105 |
| 5,604,803 A | 2/1997 | Aziz ........................... 713/155 |
| 5,606,719 A | 2/1997 | Nichols et al. ................ 710/56 |
| 5,608,865 A | 3/1997 | Midgely et al. ............... 714/1 |
| 5,617,540 A | 4/1997 | Civanlar et al. ............ 370/395 |
| 5,621,795 A | 4/1997 | Baker et al. ................. 380/277 |
| 5,630,007 A | 5/1997 | Kobayashi et al. ......... 386/113 |
| 5,642,515 A | 6/1997 | Jones et al. ................. 710/220 |
| 5,644,698 A | 7/1997 | Cannon ......................... 714/6 |
| 5,652,908 A | 7/1997 | Douglas et al. ................ 714/4 |
| 5,655,152 A | 8/1997 | Ohnishi et al. .............. 710/36 |
| 5,664,106 A | 9/1997 | Caccavale ................... 709/224 |
| 5,664,119 A | 9/1997 | Jeffries et al. .............. 710/302 |
| 5,675,723 A | 10/1997 | Ekrot et al. .................... 714/4 |
| 5,680,538 A | 10/1997 | Jones et al. .................... 714/5 |
| 5,682,509 A | 10/1997 | Kabenjian ................... 710/312 |
| 5,692,128 A | 11/1997 | Bolles et al. ................ 709/224 |
| 5,694,581 A | 12/1997 | Cheng ........................... 710/7 |
| 5,696,965 A | 12/1997 | Dedrick ....................... 707/10 |
| 5,701,406 A | 12/1997 | Matsumoto et al. ........... 714/6 |
| 5,706,458 A | 1/1998 | Koppolu ..................... 345/810 |
| 5,729,763 A * | 3/1998 | Leshem ....................... 710/38 |
| 5,732,137 A | 3/1998 | Aziz ........................... 713/155 |
| 5,732,240 A | 3/1998 | Caccavale ................... 711/118 |
| 5,734,831 A | 3/1998 | Sanders ........................ 83/520 |
| 5,734,898 A | 3/1998 | He ............................. 709/223 |
| 5,737,549 A | 4/1998 | Hersch et al. .............. 707/203 |
| 5,737,747 A | 4/1998 | Vishlitzky et al. .......... 711/118 |
| 5,740,371 A | 4/1998 | Wallis ........................ 709/229 |
| 5,740,423 A | 4/1998 | Logan et al. .................. 707/10 |
| 5,757,642 A * | 5/1998 | Jones ............................ 700/5 |
| 5,784,576 A | 7/1998 | Guthrie et al. .............. 710/302 |
| 5,796,580 A | 8/1998 | Komatsu et al. ............ 361/687 |
| 5,828,475 A * | 10/1998 | Bennett et al. ................ 398/52 |
| 5,831,525 A * | 11/1998 | Harvey ....................... 340/507 |
| 5,893,140 A | 4/1999 | Vahalia et al. .............. 711/118 |
| 5,966,510 A | 10/1999 | Carbonneau et al. ......... 714/44 |
| 5,974,503 A | 10/1999 | Venkatesh et al. .......... 711/114 |
| 5,978,570 A * | 11/1999 | Hillis ......................... 711/200 |
| 5,986,880 A * | 11/1999 | Santeler et al. ............. 361/684 |
| 6,055,228 A * | 4/2000 | DeKoning et al. .......... 370/258 |
| 6,061,750 A * | 5/2000 | Beardsley et al. ............ 710/74 |
| 6,065,087 A * | 5/2000 | Keaveny et al. ............ 710/315 |
| 6,112,276 A * | 8/2000 | Hunt et al. .................. 711/112 |
| 6,192,027 B1* | 2/2001 | El-Batal ..................... 370/222 |
| 6,240,471 B1* | 5/2001 | Schlueter et al. ............. 710/62 |
| 6,289,471 B1* | 9/2001 | Gordon ......................... 714/6 |
| 6,496,940 B1* | 12/2002 | Horst et al. .................... 714/4 |
| 6,580,531 B1* | 6/2003 | Swanson et al. .............. 398/5 |
| 6,615,315 B1* | 9/2003 | Mulvey et al. .............. 711/114 |
| 6,636,934 B1* | 10/2003 | Linnell et al. ................ 711/1 |
| 6,799,224 B1* | 9/2004 | Dellacona ..................... 714/2 |

FOREIGN PATENT DOCUMENTS

| | | |
|---|---|---|
| EP | 0 541 996 A | 5/1993 |
| EP | 0 653 759 A2 | 5/1995 |
| EP | 0 709 779 A2 | 5/1996 |
| EP | 0 760 503 A1 | 3/1997 |
| EP | 0 768 599 A | 4/1997 |
| EP | WO98/21660 | 5/1998 |
| EP | 0 929 038 A2 | 7/1999 |
| EP | WO99/46671 | 9/1999 |
| WO | WO97 07458 A | 2/1997 |

* cited by examiner

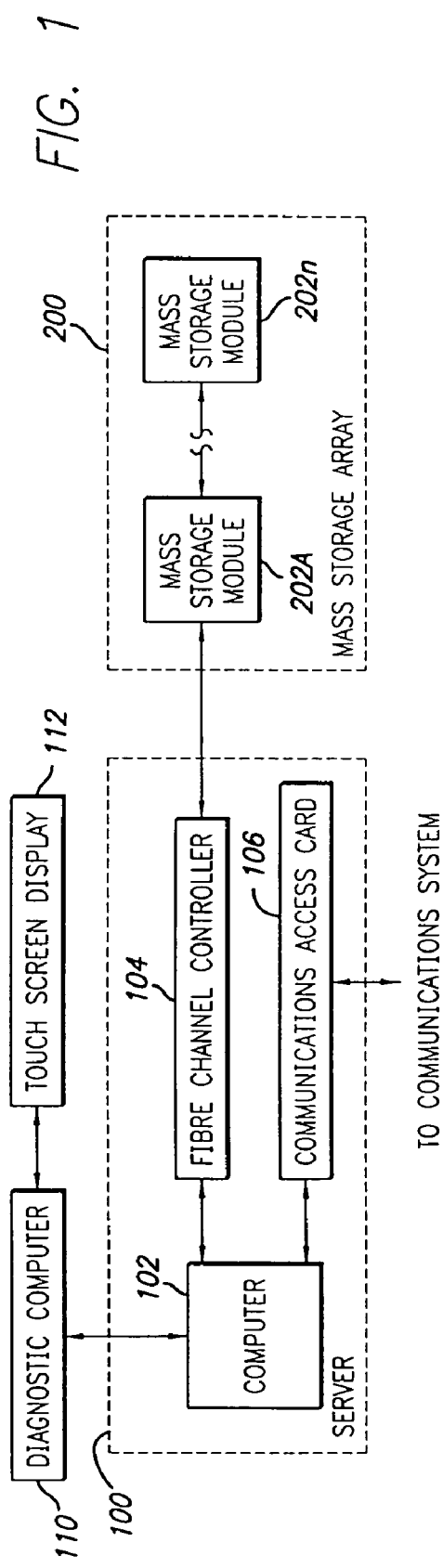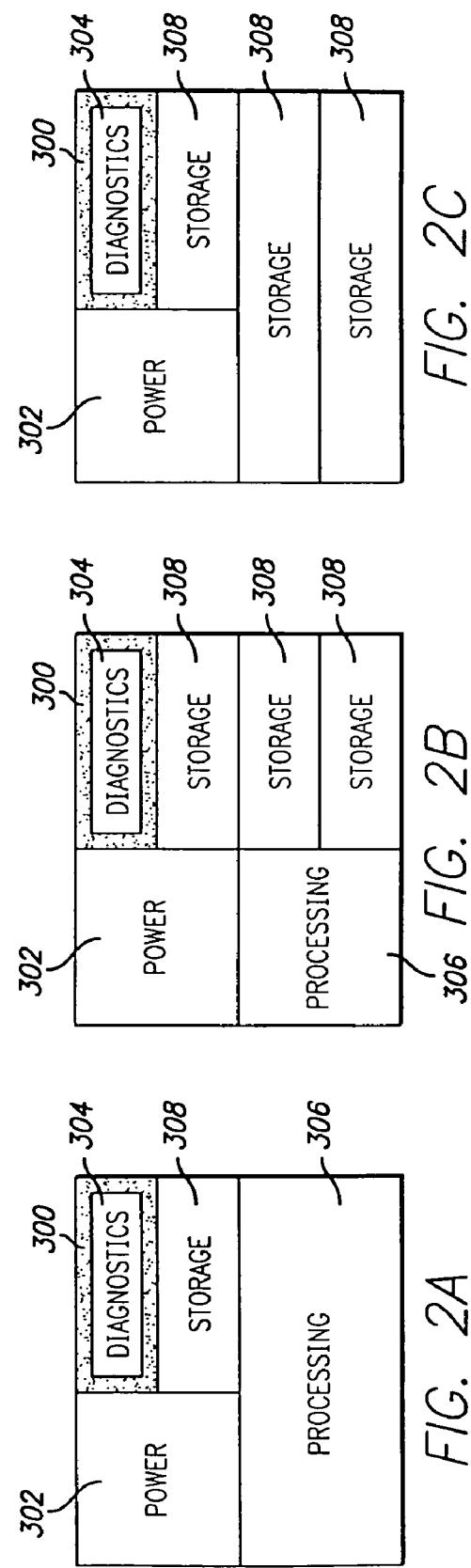

HIGH SPEED INFORMATION PROCESSING AND MASS STORAGE SYSTEM AND METHOD, PARTICULARLY FOR INFORMATION AND APPLICATION SERVERS

RELATED APPLICATIONS

This application is related to Patent Application No. PCT/US99/05231 of Richard Dellacona filed Mar. 10, 1999, which is based upon Provisional Patent Application Ser. No. 60/077,643, filed Mar. 10, 1998, and to U.S. patent application Ser. No. 09/071,282 of Richard Dellacona filed May 1, 1998, all of which are hereby incorporated herein by reference.

BACKGROUND OF THE INVENTION

1. Field of the Invention

This invention relates to a high speed, microcomputer based, Fibre Channel compatible and fault tolerant information processing and mass storage system especially suited for information servers and application servers. In particular, the present invention relates to a method and apparatus for information processing and storage involving a unique and extremely versatile system architecture, including a dual loop arbitrated, Fibre Channel capable, multiple-fault tolerant, hot-swappable mass storage disk array and including a method and apparatus for providing an enterprise-wide information or application server system using such disk array.

2. State of the Art

Efforts have been made in the past to provide a mass storage file server capable of delivering information throughout an enterprise with high speed data throughput, scalable data storage capability in a convenient, easily configurable enclosure using well known, industry standard operating software and hardware. However, such systems have typically experienced many shortcomings and problems associated with equipment incompatibility as well as with the inability of presently available computer and communications hardware to sustain performance and service failure of component devices. Such shortcomings have included the lack of capability to add storage devices to accommodate increased storage requirements or to replace failed storage devices without the need to completely power down the information server. Some of the compatibility problems have involved, for example, bottlenecks in sharing information among the equipment components of various vendors. The above-referenced Dellacona patent applications address some of these problems and others, and provide unique solutions which are described and claimed therein.

The present invention further addresses some of the problems discussed in the referenced Dellacona applications, as well as others. For example, the present invention further addresses the problem of scalability and customization in information processing and storage systems for different applications. In some applications, there may be a greater need for processing capability rather than storage capacity, while other applications may require just the opposite. Yet other applications may require storage expansion for existing information processing systems. This invention provides an architecture which will readily accommodate such needs.

In addition, mass storage systems can create considerable heat, particularly where they are disk drive based. If the heat is not effectively removed, it can affect the reliability and life of the system. Often, it is difficult to remove the heat because of obstructions caused by the physical configuration of back planes and mid planes which act as barriers to air flow. Typically, for example, all of the disk drives of a mass storage module or array are typically plugged into connectors on the face of a backplane or mid plane that extends across the entire module. Whether enclosed in a cabinet or other enclosure or rack mounted without an enclosure, air flow through the module is inhibited by this type of structural arrangement, and excessive heating can occur, particularly in the vicinity of the disk drives.

Also, it is desirable to be able to hot swap individual disk drives of a mass storage module to accommodate the need for more storage capacity, but the system storage requirements may outgrow the capacity of the module and it may also be desirable to have the capability of adding modules without powering down the system. Of course, this capability must be provided without disturbing the operation of the existing module and with a minimum of signal degradation as modules are added.

SUMMARY OF THE INVENTION

The present invention obviates one or more of the foregoing problems and/or shortcomings of the prior art through the provision of an information processing and mass storage method and system, including a unique mass storage array, particularly suited for information servers or application servers, with a novel system architecture which permits the addition or replacement of storage devices without interrupting or seriously degrading the operation of the system and which is highly fault-tolerant and reliable. In addition, the invention obviates one or more of the foregoing problems by providing a novel physical layout that permits the effective removal of heat from a system module containing heat creating components.

In accordance with one embodiment of the invention, an information processing and mass storage system adapted to be readily expandable to increase its storage capacity while the system is in operation comprises at least one module containing (a) at least one computer, (b) a plurality of plug-in storage devices such as disk drives for storing information, (c) a storage device bypass circuit board associated with each storage device, with each storage device being plugged into a connector on the bypass circuit board, (d) a module bypass circuit board including an optical input/output connector for outputting electrical signals from the module as light signals and for inputting light signals into the module as electrical signals and (e) a controller connecting the computer with each of the storage devices through its associated storage device bypass circuit board and through the module bypass circuit board.

Certain information server configurations in accordance with the invention include one or more computers, each computer connected to communicate through a Fibre Channel controller with a mass storage array comprising a plurality of bypass circuit boards, at least some of which are connected to an information storage device. In one embodiment, the controller provides a dual loop communications channel comprising two complete communication paths to each of bypass circuit boards and associated storage devices. In another embodiment, the controller provides a single loop which traverses the bypass circuit boards and any associated storage devices twice. In one configuration with two or more computers, the Fibre Channel controller connected to each computer communicates with the mass storage array through a Fibre Channel controller bypass card.

In a preferred embodiment the computer is preferably a suitable conventional single board computer. The controller preferably is a conventional arbitrated dual channel Fibre Channel system through which the computer communicates with each of the storage device bypass circuit boards and the module bypass circuit board. The bypass circuit boards may be any suitable circuits which form a continuous loop for the Fiber Channel controller regardless of whether a disk drive is plugged into the drive bypass circuit board. The loop continues through other modules when they are connected to the module bypass circuit thereby readily permitting expansion while maintaining a unitary information processing and mass storage system.

In accordance with another embodiment of the present invention, a high speed information processing and mass storage system includes two modules, each including a plurality of disk drives in a hot-swappable, disk drive array. Each disk drive array is connected to a module bypass circuit which includes an optical input/output connector, preferably an optoelectronic transceiver. The optical input/output connectors of the modules are connected by a fiber optic transmission medium such that signals are communicated between the modules in the form of light. With this configuration, modules may be added to increase storage capacity without interrupting the operation of each other and without serious signal degradation.

In accordance with yet another embodiment of the present invention, a high speed information processing and/or mass storage system with disk drives for information storage includes at least one module with a plurality of drive bypass circuit boards, each including a drive bypass circuit board connector. At least one opening is provided between connectors to permit the flow of air between the connectors. Each drive bypass circuit board is a relatively flat circuit board with connectors on different edges of the board, wherein one of the connectors is the connector which receives the disk drive and the other connector connects to said drive bypass circuit board connector. The connectors, bypass circuit boards and drives are arranged such that when they are connected there is a path for air flow from outside the module alongside each bypass circuit board and its associated disk drive for cooling purposes without any backplane obstruction. Where the mass storage system is housed in an enclosure, at least one fan is mounted to force air from outside said enclosure through the spaces between said bypass boards and drives, preferably through the openings between the drive bypass circuit board connectors.

It will be appreciated that the present invention provides a novel high speed information processing and/or mass storage system particularly suitable for information and application servers. The system is scalable, fault tolerant, and reliable both because of its novel system architecture and its physical layout. Other features and advantages of the invention will become apparent from the following detailed description of exemplary and preferred embodiments when read in conjunction with the drawings which illustrate, by way of example, the principles of the invention.

BRIEF DESCRIPTION OF THE DRAWINGS

FIG. 1 is a functional block diagram generally illustrating an information or application server system according to the present invention using a high speed mass storage system of the invention;

FIGS. 2A, 2B and 2C are diagrammatic representations illustrating various system configurations for different applications wherein different ratios of processing and storage are required;

DETAILED DESCRIPTION OF PREFERRED EMBODIMENTS

Figure 3:
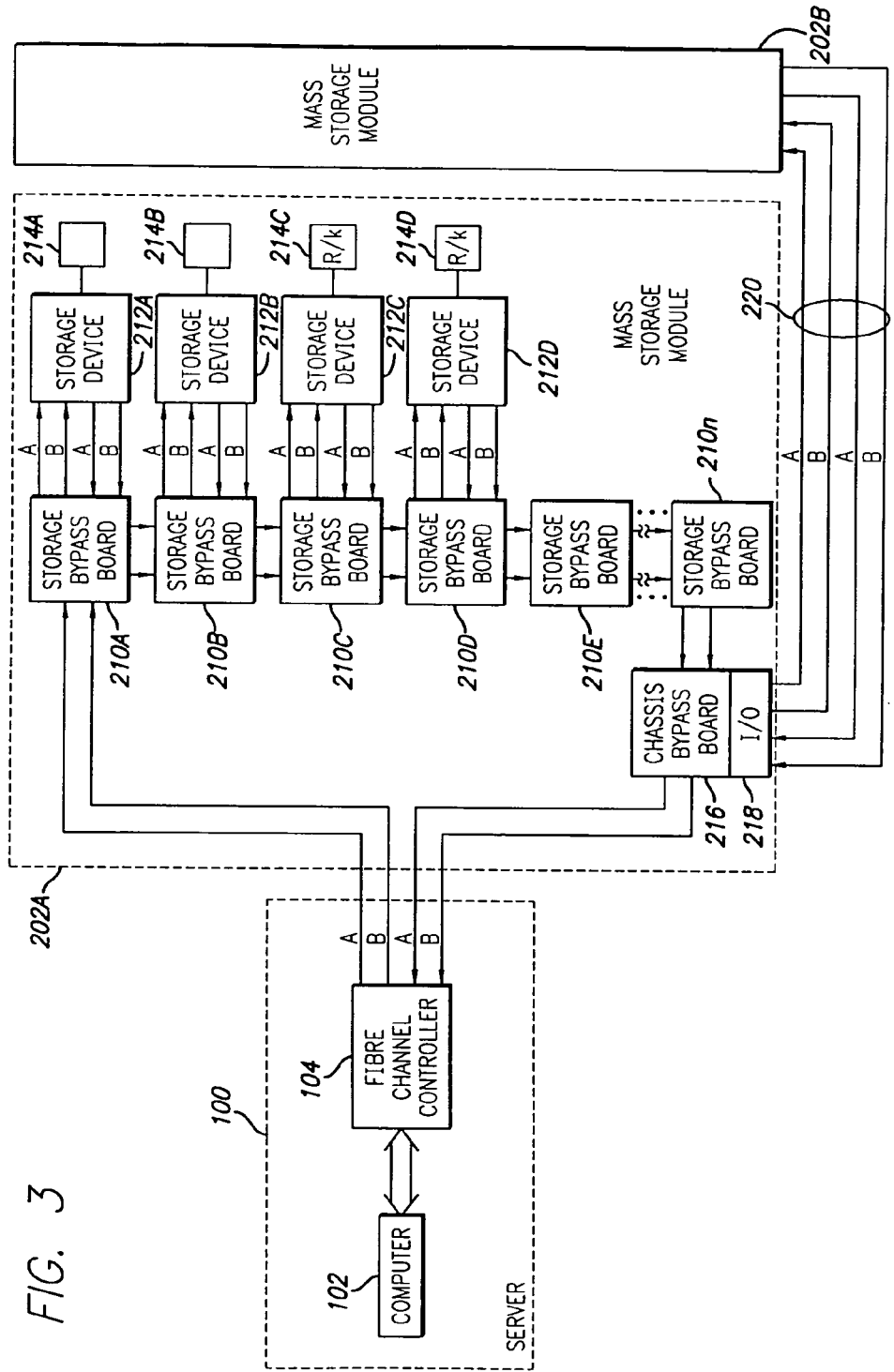
FIG. 3 is a functional block diagram illustrating a mass storage module of FIG. 1 in greater detail.

One embodiment of an information or application server system in accordance with the present invention using the high speed information processing and mass storage system of the invention is illustrated in FIG. 1. Referring to FIG. 1, the server, designated generally by the reference numeral 100, includes a computer 102, a controller 104, preferably a Fibre Channel controller, and a communications interface or access card 106. The server 100 communicates via the Fibre Channel controller 104 with a mass storage array 200 which includes one or more mass storage modules 202A . . . 202n. As illustrated, the computer 102 may also communicate with a suitable diagnostic computer 110 as is described in the aforementioned Dellacona applications.

The computer 102 preferably comprises single board high speed computer running a computer industry standard operating system software program such as, for example, Windows NT available from Microsoft Corporation. An operating system like Windows NT may be stripped down to remove those elements of the program which are not needed, if desired to preserve memory or to increase operating speed. Suitable conventional drivers of the type used for similar applications may be provided as necessary to support the particular architecture being implemented.

The computer may include a display such as a touch screen display, and various storage and peripheral devices (not shown) as required. The single board computer can include any of a wide number of suitable devices including, but not limited to, the Compact PCI CPU Board with Pentium Processor, Model No. ZT 5510, available from Ziatech Corporation. Modifications to enhance performance of the ZT 5510 can include an onboard 40 MB flash memory card for permanent storage of the non-reconfigurable portions of the Windows NT operating system software and an onboard, removable, PCMCIA 40 Mb flash memory card, "D2 FlashDisk" available from Sandisk Corporation for read/writeable storage of the reconfigurable portions of the Windows NT software.

The Fibre Channel controller 104 may be any suitable design according to the Fibre Channel Consortium created as a separate board or incorporated into the single board computer design. The communications interface or access card 106 may be any suitable device made in accordance with well known T-1 communications architecture, and/or architecture adapted for compatibility with other network and telecommunications architectures, protocols and topologies including, but not limited to, T-3, DS-3, OC-3C, OC-12C, OC-192C, FDDI, SONET, SCSI, TCP/IP, HiPPI and ATM. In addition, the computers 102 and 110 may be networked together and with other computers through appropriate ethernet cards or other suitable networking techniques. The respective manufacturer, Fibre Channel Consortium and I2O Special Interest Group reference design data sheets and materials describing the detailed operating capabilities and specifications of each of the foregoing components are hereby incorporated by reference in their entirety. Also, further information concerning possible subsystems and connection protocols for the server are described in the referenced Dellacona applications.

FIGS. 2A, 2B and 2C illustrate generally three types of system configurations which can be addressed in accordance with the architecture of the present invention. Each Figure is diagrammatically illustrative of a chassis 300 with a power supply section 302 and a diagnostics section 304. In addition, the chassis includes a processing section 306 such one or more of the servers 100 of FIG. 1, and/or a storage section 308 such as one or more of the mass storage modules 202 of FIG. 1. The size of the processing and storage sections can be readily configured for a particular application.

For example, FIG. 2A illustrates an arrangement for a high volume server such as an application server, a movie server (e.g., for video streaming to multiple users) or communications in conjunction with a carrier-class switch. It can be seen that the processing section 306 includes ten slots, each preferably representing a single board computer. In contrast, the storage section 308 has only five storage slots, each representing a high speed, high capacity storage device such as a disk drive. Thus, the processing function is stressed over the storage function. On the other hand, FIG. 2B illustrates an arrangement which might be suitable for a web-server or web-hosting. Here, the processing section 306 comprises two slots of the chassis whereas the storage section 308 comprises fifteen slots. FIG. 2C illustrates a chassis arrangement suitable primarily for storage expansion. Here, there is no processing section and the chassis is devoted to storage.

FIG. 3 illustrates an embodiment of the mass storage array 200 of FIG. 1 in greater detail as it could be configured with a single computer server 100 and one or more mass storage modules 202. Referring to FIGS. 1 and 3, the mass storage array 200 includes one or more modules 202A, 202B . . . 202$n$, each of which is preferably identical architecturally, although they may contain different numbers of storage devices and different types of storage devices. Each module 202 includes bypass circuit boards 210A, 210B . . . 210$n$ and at least some storage devices 212A, 212B . . . . 212$n$ connected to the boards 210. In addition, each storage device is preferably provided with an associated read/write switch 214A, 214B . . . 214$n$, respectively.

Each module 202 has a module or chassis bypass circuit board 216 in the communication path of the Fibre Channel controller 104. The chassis bypass circuit board 216 of module 202A is provided with an optical input/output connector 218 for outputting electrical signals from the module 202A as light signals and for inputting light signals into the module 202A as electrical signals. Likewise, the modules 202B . . . 202$n$ have chassis bypass circuit boards 216 with associated input/output connectors 218 (not shown). As illustrated, the input/output connector 218 of the chassis bypass circuit board of module 202A is adapted to be connected via a light transmission medium such as optical fibers 220 to the optical input/output connector 218 (not shown) of the chassis bypass circuit board of module 202B.

As was previously noted, the controller 104 preferably is a conventional Fibre Channel Controller (FCC) which operates on a Fibre Channel protocol, and preferably is an arbitrated dual channel Fiber Channel Controller. The controller 104 provides a dual channel communication path within each module 202 between the computer 102 and each of the operable storage devices 212. As is described hereinafter in greater detail, the bypass circuit boards 210 ensure that the communication path is complete even if a storage device 212 is inoperable (i.e., is not operable at or above some minimum level as is hereinafter described in greater detail) or has been removed from the connector on the bypass circuit board.

In that regard, each of the storage devices 212 is preferably a high speed, high capacity, conventionally available disk drive which is removably connected to its associated bypass circuit board 210. Preferably, the disk drive plugs into a connector on the bypass circuit board 210 so that it can be readily removed and replaced or so that drives may be added to empty bypass circuit board positions, as needed to expand the storage capacity of the module. Each bypass circuit board 210 includes circuits which connect the controller 104 to the disk drive 212 when the disk drive is plugged in and is conveying to the bypass circuit board that it is operable at a certain minimum level. On the other hand, the bypass circuit board 210 connects the controller 104 directly to the next bypass circuit board, bypassing the disk drive 212, when the disk drive is not plugged in or is not operating at or above the minimum level. Any suitable, conventional disk drive of the type that runs self-diagnostics and provides a fault/no fault output signal may be used for this purpose.

With further reference to FIG. 3, by way of example, the bypass circuit board 210A directs communications to the associated storage device 212A and then to the next bypass circuit board 210B when an operable storage device 212A is connected to the bypass circuit board 210A. When the storage device 212A is inoperable, i.e. not operating at some minimum satisfactory level, or when there is no storage device connected to the bypass circuit board 210A, e.g., if the storage device is removed for replacement, the dual channel communication path proceeds through the bypass circuit board 210A without interruption, i.e., bypasses the storage device connector. While one embodiment of a bypass circuit board to accomplish the foregoing connection and bypass functions is described hereinafter in greater detail, it will be appreciated by one skilled in the art that these functions can be accomplished in any suitable conventional manner by electronic switching circuits controlled by the fault/no fault signal from the storage device.

With continued reference to FIG. 3, the module or chassis bypass circuit board 216 provides functions similar to the storage or drive bypass circuit boards 210 in the sense that they either route communications back to the controller directly if there is no additional module 202B connected to the module 202A or they route communications to the next module 202B if one is connected and signals are being received. In the case of a single module 202, therefore, there is a dual channel communications loop entirely within the module by which the computer 102 communicates with each of the disk drives 212. On the other hand, by virtue of the chassis bypass circuit board 216, the dual channel communications loop extends to each of the disk drives 212 in the next module when one is connected. Specifically, if there is an additional module 202B connected to module 202A as illustrated, then communications from the computer 102 of module 202A are directed by the module bypass circuit board 216 to the next module 202B via connectors 218 and optical fibers 220 so that module 202B is within and traversed by the dual Fibre Channel communication loop.

It will be appreciated that with the above described architecture, individual mass storage device modules 202 of the mass storage array 200 may be expanded internally by adding disk drives or other suitable storage devices, and bad disk drives may be replaced without affecting the operation of the rest of the module or the system it is used in. This provides an extremely versatile hot swappable, hot expandable, mass storage device array. In addition, when the demands of the system exceed the capacity of a single module, an additional module may be added, again without interrupting the operation of the rest of the array or its system.

As was explained above, the Fibre Channel controller provides a dual path through each module of the mass storage array 200. In accordance with the present invention, the system can be configured so that the dual path is a single path which traverses the mass storage array twice or two independent paths as is illustrated in FIGS. 4A and 4B.

Figure 4A:
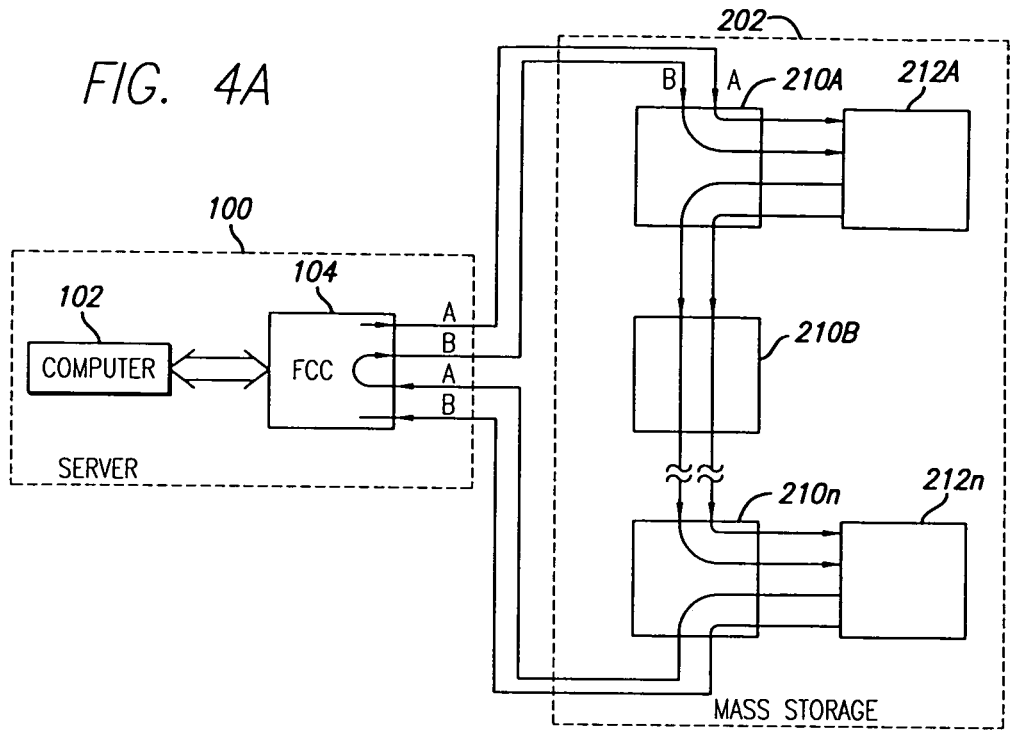
FIG. 4A is a functional block diagram illustrating the dual loop communication path from the Fibre Channel controller of FIG. 3 connected so as to provide one logical Fibre Channel communication path traversing each of the storage device bypass circuit boards twice.
Figure 4B:
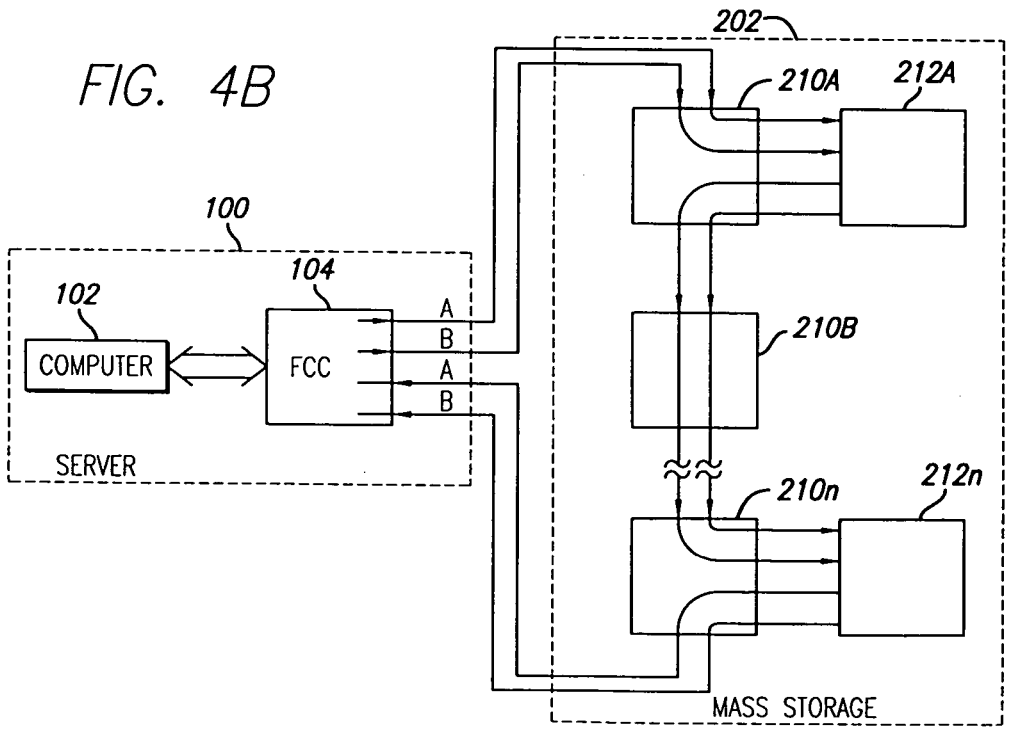
FIG. 4B is a functional block diagram illustrating the dual loop communication path from the Fibre Channel controller of FIG. 3 connected so as to provide two logical Fibre Channel communication paths traversing each of the storage device bypass circuit boards once, thereby being independently available to communicate with each of the storage devices.

Referring now to FIGS. 4A and 4B, the Fibre Channel controller (FCC) 104 includes two output paths A and B. Each path traverses the mass storage module 202 as illustrated, communicating with each of the present and operable storage devices 212 and returning to the FCC. In the FIG. 4A embodiment, the A path returning to the FCC is looped back to the B output path. Accordingly, a single continuous path traverses the mass storage module twice. In the FIG. 4B embodiment, the A return path is not looped back to the B output path. Accordingly, two paths traverse the mass storage module and can be used independently. This latter embodiment provides a second path in the event that one path fails.

It will be appreciated by one skilled in the art that the FIGS. 4A and 4B embodiments provide redundancy and fault tolerance. The FIG. 4A embodiment is somewhat simpler to implement because only one set of chips is necessary to provide the single Fibre Channel capability required for the single loop. Still, if one of the loops is broken or encounters some other fault, that loop can be bypassed within the controller, and the other loop is still available. Similarly, while the FIG. 4B embodiment may be more complex and expensive to implement, it provides two independently addressable loops for fault tolerance and redundancy, but also provides significantly greater communications bandwidth.

Figure 5:
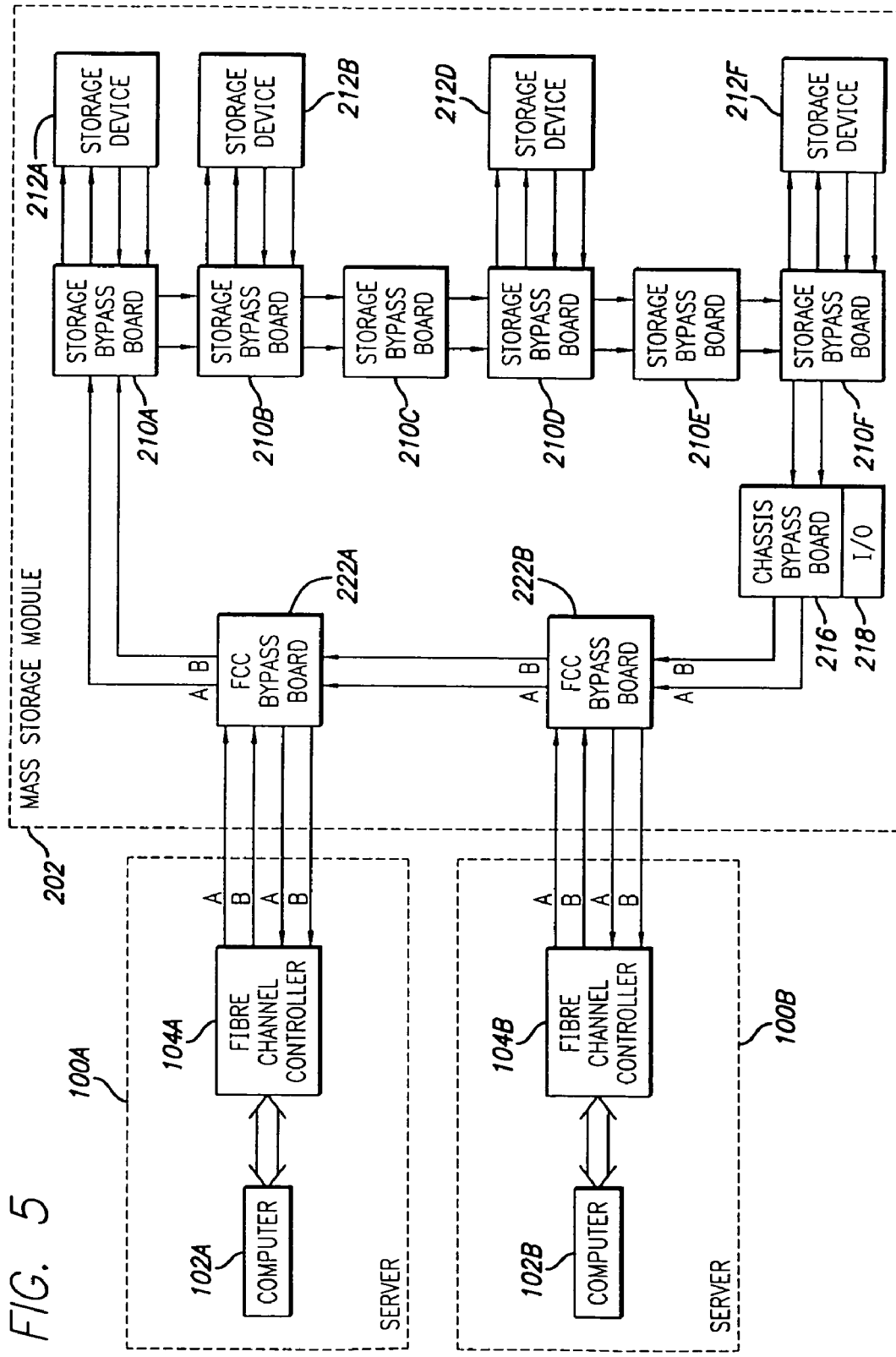
FIG. 5 is a functional block diagram illustrating an information or application server system according to the present invention wherein two or more servers are connected to a mass storage array which may include one or more mass storage modules.

FIG. 5 illustrates a further configuration which is made possible by the system architecture of the present invention. In the FIG. 5 embodiment, two servers are connected to a mass storage array, a first module of which is illustrated. The servers 100A and 100B are connected to Fibre Channel bypass boards 222A and 222B, respectively. The operation of the computers 102A and 102B may be sensed by the Fibre Channel bypass boards, for example by sensing signal flow as with the chassis bypass board, so that the computers 102A and 102B can operate together or, in the case of a fault, separately. As was previously mentioned, each server may have flash memory, and in the embodiment of FIG. 5, each computer 102A and 102B has its own flash memory with its operating system stored therein. In this fashion, the computers can boot independently from its associated flash memory rather than from the shared memory or other disk arrangement.

It will be appreciated that the system configuration illustrated in FIG. 5 provides two servers and thus increased processing power. In addition, one server provides backup to the other in the event of failure, thereby providing increased fault tolerance and reliability. In addition, the architecture of FIG. 5 permits the two servers to communicate with each other at Fibre Channel speeds, higher than could be achieved with 100BaseT LAN, using IP protocol.

Figure 6:
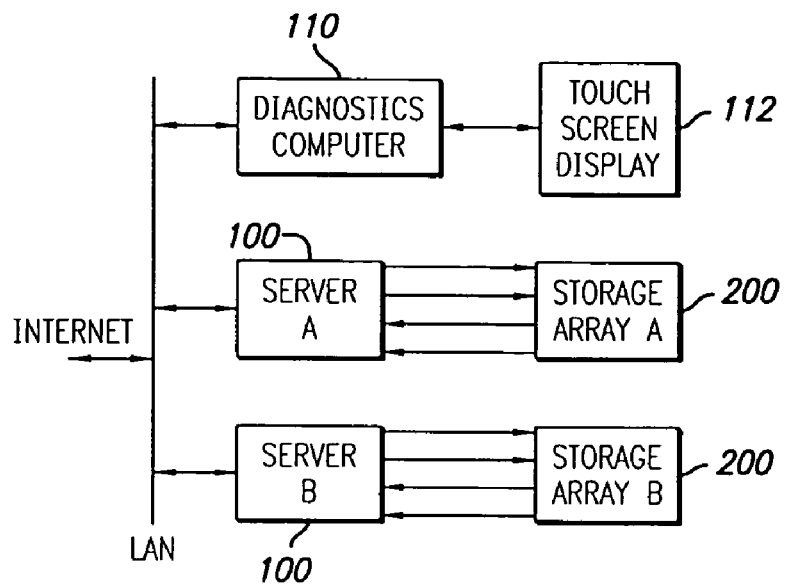
FIG. 6 is a functional block diagram illustrating an embodiment of a web server application configured in accordance with the architecture of the present invention.

It can be seen that system architecture according to the present invention lends itself to a wide variety of configurations to accommodate a variety of applications. FIG. 6 illustrates one configuration wherein two servers A and B are connected in a suitable local area network (LAN) configuration with access to the internet. Server A has its own mass storage array 200 as does server B. It will be appreciated that several servers and storage arrays can be networked in this fashion to provide a very powerful information or application server system particularly suitable for web server applications. In addition, this configuration, permits full duplication of computer/mass storage systems rather than sharing a mass storage system as with the embodiment of FIG. 5. Moreover, while the FIG. 6 embodiment illustrates communication over a LAN which typically may be a 100BaseT LAN, it will be appreciated that this may be a Fibre Channel LAN if rates in the gigabit range are desired. These features and advantages may be the ideal choice for critical processing applications such as web servers.

Figure 7:
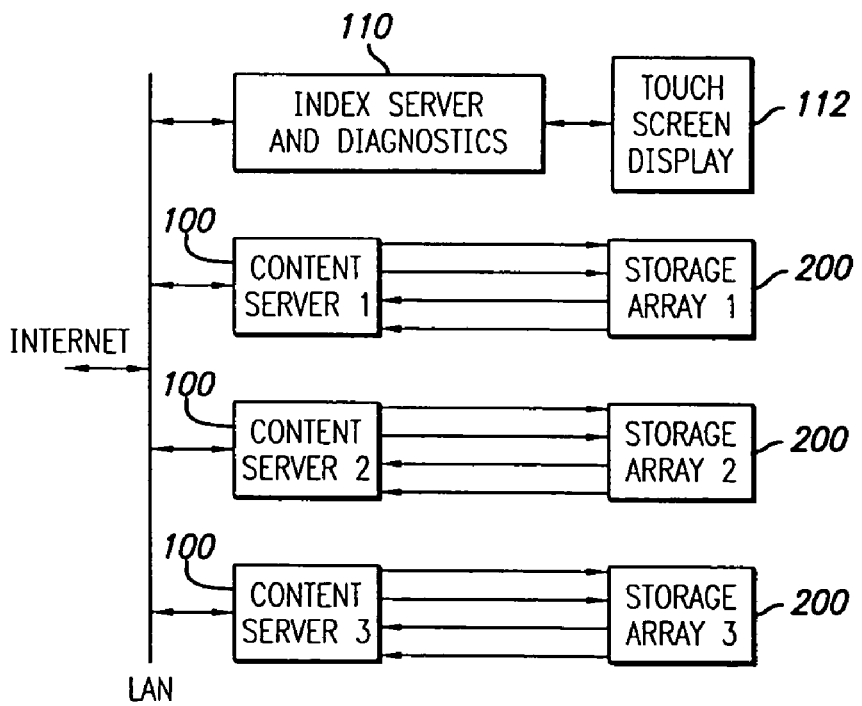
FIG. 7 is a functional block diagram illustrating an embodiment of a basic video streaming application configured in accordance with the architecture of the present invention.
Figure 8:
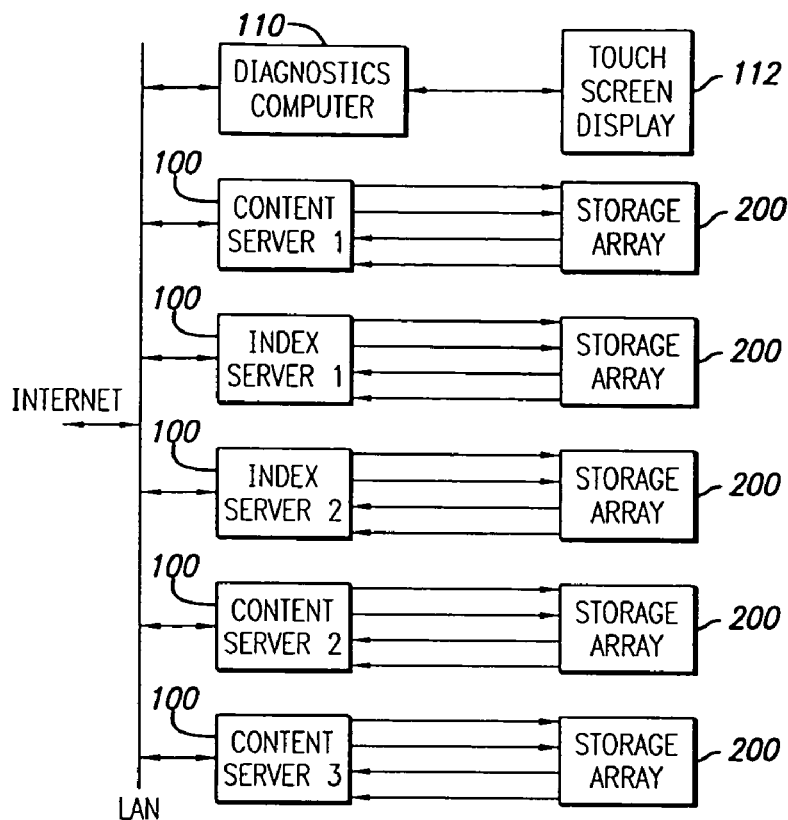
FIG. 8 is a functional block diagram illustrating another embodiment of a video streaming application configured in accordance with the architecture of the present invention and including a duplicated index server.
Figure 9:
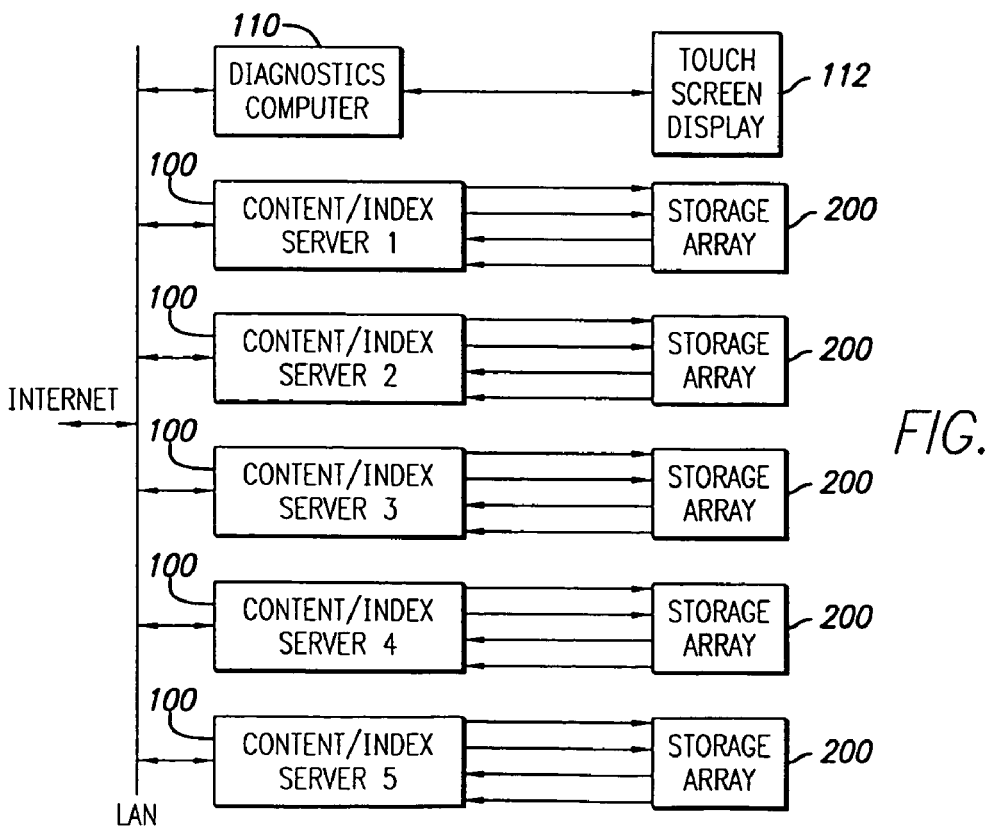
FIG. 9 is a functional block diagram illustrating another embodiment of a video streaming application configured in accordance with the architecture of the present invention and including a distributed index server.

FIG. 7 illustrates another configuration particularly useful for video streaming applications. In this embodiment, the diagnostics computer 110 also has indexing functions for controlling access to content servers 1, 2 and 3. The content servers 100 provide access to video stored in their associated storage arrays 200. Alternatives, also particularly suitable for video streaming applications, are shown in FIGS. 8 and 9. In the FIG. 8 embodiment duplicated index servers separate from the diagnostics computer are provided with their own storage arrays. In the illustrated embodiment there are two index servers 1 and 2 and there are three content servers 1, 2 and 3, each with an associated storage array. In the FIG. 9 embodiment, the functions of the index servers are distributed among the content servers so that there are multiple index/content servers 1-5. One skilled in the art will appreciate that the FIG. 8 approach uses an architecture where the index server or servers coordinate content streaming from the content servers whereas in FIG. 9 the index and content server functionality is distributed across all servers, providing extensive scalability.

Figure 10:
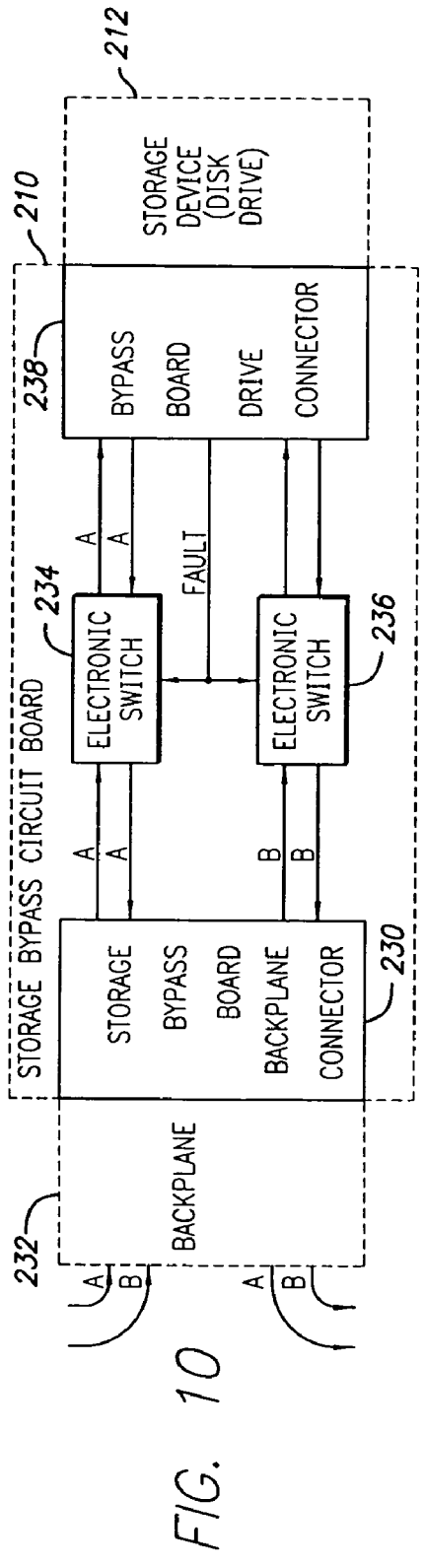
FIG. 10 is a functional block diagram illustrating one embodiment of a storage device bypass circuit board according to the present invention.
Figure 11:
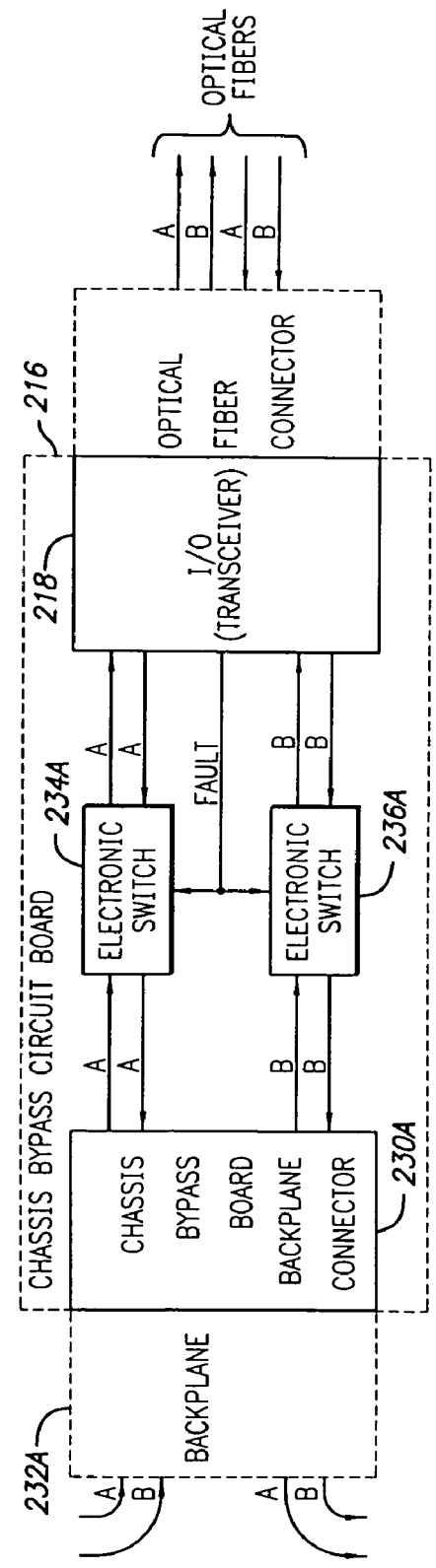
FIG. 11 is a functional block diagram illustrating one embodiment of a chassis bypass circuit board according to the present invention.

FIGS. 10 and 11 are functional block diagrams which generally illustrate the storage and chassis bypass circuit boards 210 and 216, respectively, in greater detail. Referring to FIG. 10, the storage bypass circuit board 210 includes a bypass board backplane connector 230 arranged to plug into a connector on the backplane generally indicated at 232. The A and B signal paths coming from a previous bypass circuit or directly from the Fibre Channel controller are connected through the backplane to the bypass board via the backplane connector 230. Similarly, the A and B signal paths emerge from the bypass board 210 via the bypass board backplane connector 230.

The A signal path from the backplane connector 230 is connected to a suitable conventional electronic switch 234. The B signal path from the backplane connector 230 likewise is connected to an electronic switch 236. The A and B signal paths from electronic switches 234 and 236 are connected to a bypass board storage card or drive connector 238 where they are routed to the storage device (e.g., a disk drive) 212.

The return A signal path from the bypass board drive connector 238 is connected to the switch 234, and the return B signal path from the connector 238 is connected to switch 236. A fault signal produced by the storage device to indicate its presence and its level of operability as was described above is applied to each of the electronic switches 234 and 236 to control the switching thereof. The A and B return paths from the switches 234 and 236 are connected to the bypass board backplane connector 230 where they are routed through the backplane 232 to the next bypass circuit board or to the Fibre Channel controller.

In operation, the A signal path enters the bypass circuit board and is connected to the switch 234. If the fault signal is not present (i.e., there is no fault and the signal is in a low or negative signal state) indicating that the storage device is not present or is inoperable, the switch 234 returns the A signal path to the bypass board backplane connector 230 thus bypassing the storage device 212. The B signal path similarly is looped back to the backplane connector 230 by the electronic switch 236 if the fault signal is low. On the other hand, the A and B signal paths are routed through the switches 234 and 236 to the storage device and then back through the switches when the fault signal is high or positive indicating the storage device is present and operable.

Referring now to FIG. 11, the chassis bypass circuit board is essentially the same as the storage bypass circuit board except the selection made by the electronic switches 234 and 236 is between acting as a bypass or connecting the A and B to the I/O connector 238. In this regard, the I/O connector is preferably a conventional optical fiber transceiver for use in bi-directional communication applications over multimode optical fiber, particularly in multimode or single mode Fibre Channel applications. For example, the transceiver may be a model MLC-25-6-X-T optical fibre channel small factor (SFF) transceiver available from Methode Electronics, Inc. of Chicago, Ill. Such transceivers include a light transmitter and receiver as well as a standard receptacle for receiving an industry standard optical fiber connector. In addition, the transceiver provides a signal detect output (the fault signal in FIG. 11) which indicates whether or not the transceiver is receiving a light signal. If it is not, the fault signal causes the electronic switches 234A and 236A to loop the A and B paths back to the chassis bypass board connector 230A. If, on the other hand, the fault signal indicates that a light signal is being received by the transceiver 218, the electrical signals on the A and B paths are passed through the switches 234A and 236A to the transceiver 218 where they are converted to light signals and transmitted over the optical fibers forming the A and B paths to the next chassis. Similarly, light signals returned from the next chassis on the A and B paths are converted back to electrical signals by the transceiver 218 and returned along the A and B paths through the switches 234A and 236A to the connector 230A and onto the next bypass circuit or the Fibre Channel controller.

Typically, each of the modules 202 of a mass storage device array such as the one shown in FIG. 3 is enclosed in a housing or, if mounted in a rack, may be surrounded by other structures and/or other circuit boards. The server components such as the computers 102 and 110, the touch screen display 112, the Fibre Channel controller, and other system components such as communication access cards, ethernet cards, LAN components and the like may also be mounted within the same housing or on the same rack. Heating may therefore be a problem, particularly where the storage devices used in the modules are disk drives driven by motors. Accordingly, the preferred embodiment of the present invention as illustrated in FIGS. 12A and 12B includes a physical structure and arrangement of the various bypass circuit boards and storage devices that accommodates the circulation of cooling air throughout the module without minimal obstruction.

In accordance with one aspect of this physical structure of the invention, each of the drive bypass circuit boards 210 is a relatively thin circuit board. The circuit board is, however, unlike typical circuit boards built to receive a disk drive or other mass storage device. In such conventional circuit boards, the connector or plug which receives the plug-in disk drive typically is positioned so that the disk drive extends perpendicular to the plane of the board. For example, it is usual to have the bypass circuits and/or the communications paths between them on a backplane or midplane circuit board which extends across the module in a fashion similar to a computer motherboard which extends across the computer chassis and has connectors to receive various plug-in cards or boards. That arrangement creates an obstruction which makes it more difficult to effectively cool heat producing storage devices such as disk drives.

Figure 12A:
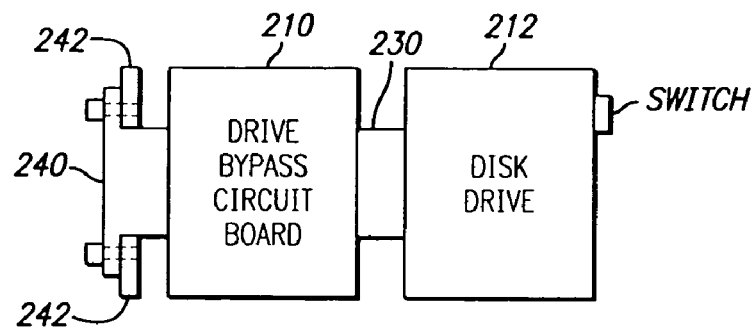
FIGS. 12A and 12B are diagrammatic representations of the physical layout of a drive bypass circuit board and disk drive illustrating the preferred connector arrangement according to the present invention.
Figure 12B:
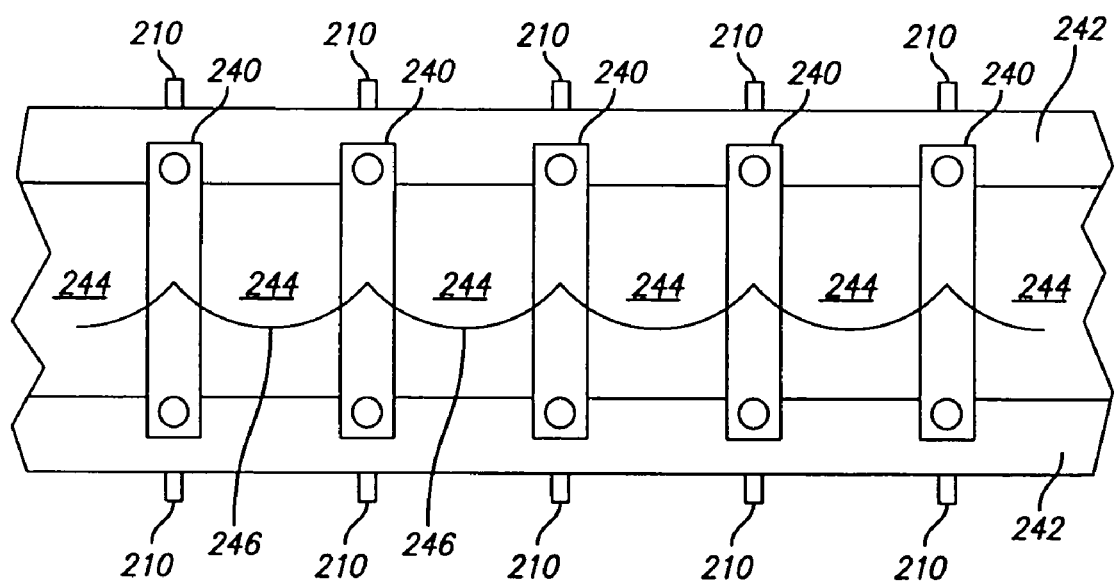

As is illustrated in FIGS. 12A and 12B, the present invention does not use either a circuit board midplane or a backplane structure. Instead, the connector on the drive bypass board which receives the disk drive (e.g., the connector 238 in FIG. 10) is at the edge of the board so that the drive, when plugged in, extends parallel to the circuit board. In addition, the drive bypass circuit board itself is not plugged into a backplane circuit board. Rather, a connector is provided on the edge of the board, preferably opposite the disk drive connector as illustrated at 239 in FIG. 10, and that connector plugs into an individual connector which is mounted on a frame or other structural member of the chassis and which is wired or otherwise connected to similar connectors for the other disk bypass circuit boards.

FIG. 12A shows a side view of the disk drive 212 plugged into the drive bypass circuit board 210 via connector 238, with the drive bypass circuit board plugged into connector 240 suitably mounted on structural members 242 of the chassis or rack containing the mass storage module and/or server and its associated components. FIG. 12B is an end view illustrating several bypass circuit boards 21 plugged into the connectors 240 which are in turn connected by screws or other suitable means to the structural members 242. Since there is no backplane which would normally make the connections between adjacent components, electrical or light connections generally indicated at 246 are suitably provided between the connectors 240 to provide the communications required, as illustrated, for example, in FIGS. 3 and 5.

It can be seen that between each connector 240 there is a space 244 through which air can readily be drawn or forced by a fan or other air circulation means as is necessary. Even if the structural members are part of a housing that surrounds the components, screening or other suitable openings can be provided so that the areas 244 permit sufficient air flow. It can also be seen that because the disk drive is plugged into the bypass circuit board so that their planes are parallel and not perpendicular, there is no obstruction of air flow.

It will also be appreciated that this arrangement is particularly suited for field service of the unit and is readily upgradeable. Connectors can be readily replaced in the field without the need to change a complete backplane or midplane board, and in some instances repairs of this sort can be carried out with little or no down time. In addition, the illustrated connection arrangement permits expansion without the limitations encountered when using a backplane or midplane with a fixed number of expansion slots and without the other physical and electrical limitations encountered with backplanes or midplanes.

Figure 13B:
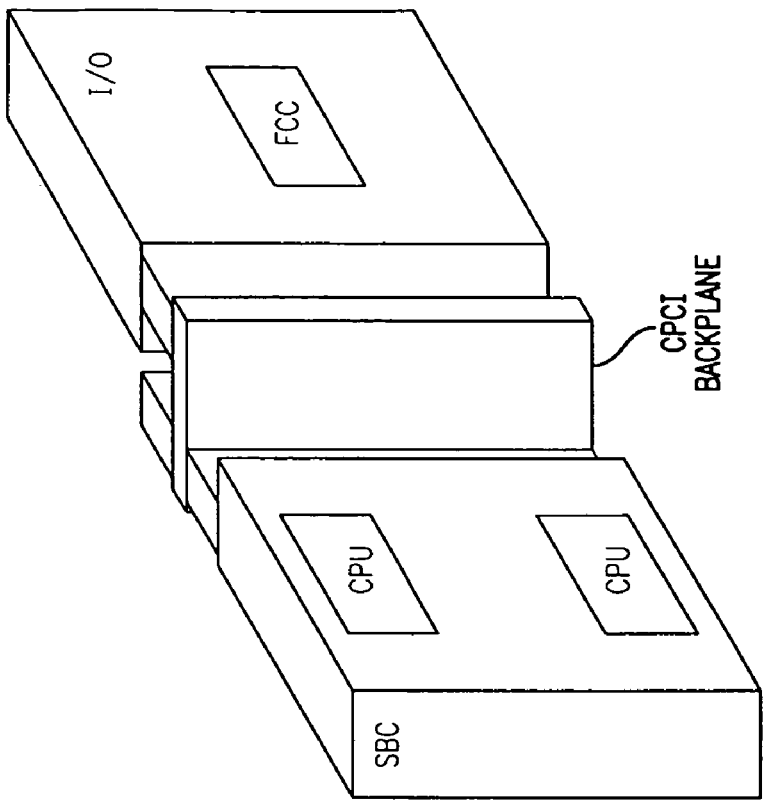
FIGS. 13A and 13B are diagrammatic representations of a connector arrangement for connecting a single board computer (SBC) to various input/out devices according to the present invention.
Figure 13A:
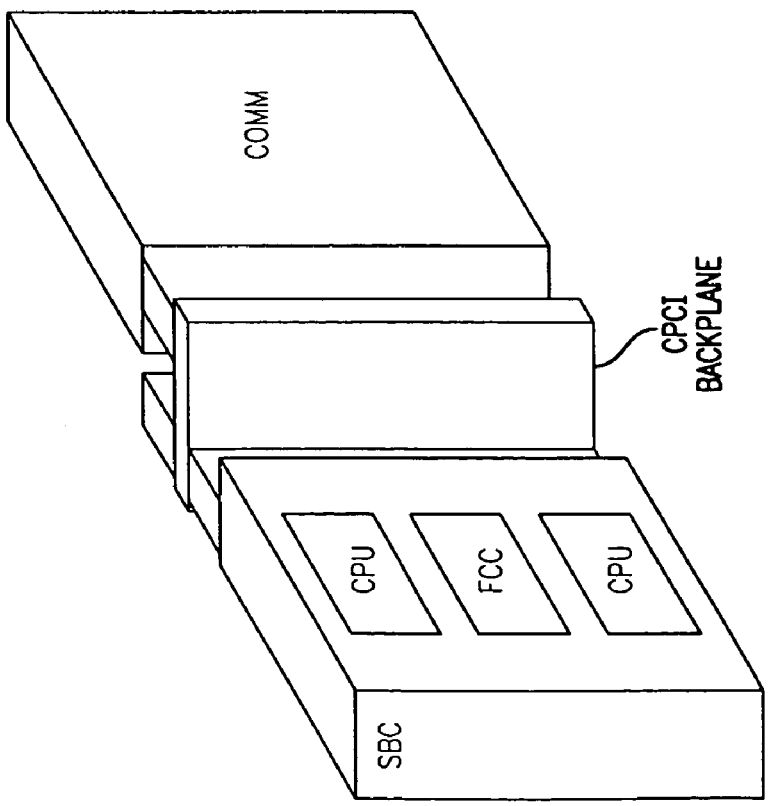

Similar physical arrangements may be used to connect computers to their associated components to create the desired server configuration. For example, as illustrated in FIG. 13A, a single board computer of the type previously described in connection with the description of the server 100 may connect to the communications card 106 through a mini compactPCI (CPCI) backplane. In this case, the single board computer SBC may incorporate the Fibre Channel controller FCC. Likewise, in FIG. 13B, the SBC may connect to an input/output unit I/O at the left rear connector of the CPCI backplane. In this case, the I/O may include the FCC functions. Again, it will be appreciated that the foregoing advantages are achieved with this sort of simple backplane or midplane structure which does not extend across the cabinet or rack.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A high speed mass storage system which is readily expandable to increase its storage capacity while the system is in operation comprising:

a first server including a first controller and at least one first computer connected in communication with said first controller, each said at least one first computer including at least one CPU;

a second server including a second controller and at least one second computer connected in communication with said second controller, each said at least one second computer including at least one CPU;

first and second mass storage modules each including:

(a) a plurality of plug-in storage devices for storing information;

(b) a storage device bypass circuit board associated with each storage device, each storage device being plugged into a connector on the storage device bypass circuit board, and each of said storage device bypass circuit boards of said first and second mass storage modules including first and second electronic switches, each of said first and second electronic switches including input and output electrical connections to said first and second controllers, respectively, each of said first and second electronic switches including input and output electrical connections to a corresponding one of said plug-in storage devices, and a fault signal output produced by said corresponding one of said plurality of storage devices being connected to each of said first and second electronic switches to control switching of said first and second electronic switches to alternatively route signals from and to said first and second controllers to and from said corresponding one of said plurality of storage devices, or to bypass said corresponding one of said plurality of storage devices;

(c) a module bypass circuit board including an optical input/output connector for outputting electrical signals from the module as light signals and for inputting light signals into the module as electrical signals, and wherein the optical input/output connectors of the module bypass circuit boards of the first and second mass storage modules are connected by a fiber optic transmission medium such that signals are communicated between the first and second mass storage modules in the form of light;

said first controller providing a communication path between the first server and each said storage device through its associated storage device bypass circuit board and through the module bypass circuit board, said second controller providing a communication path between the second server and each said storage device through its associated storage device bypass circuit board and the module bypass circuit board; and at least one of said servers being operative to establish direct communication between the first and second controllers, and said first and second controllers being operative to maintain direct communication between the first and second controllers independent of said at least one first computer of said first server and said at least one second computer of said second server.

2. The high speed mass storage system of claim 1 wherein each storage device bypass circuit board completes the connection of the at least one first computer or the at least one second computer with the other storage device bypass circuits and their associated storage devices whether or not the storage device is present.

3. The high speed mass storage system of claim 1 wherein each said module bypass circuit board outputs electrical signals from the corresponding mass storage module via the optical input/output connector when light signals are received by said optical input/output connector.

4. The high speed mass storage system of claim 1 wherein the module bypass circuit board of the first mass storage module outputs electrical signals from the first mass storage module to the second mass storage module via the optical input/output connector when light signals are received from the second mass storage module by said optical input/output connector.

5. The high speed mass storage system of claim 1 wherein each said mass storage module includes a storage device bypass board connector for each of the storage device bypass circuit boards with an opening between each connector to permit the flow of air between the connectors and alongside the bypass circuit boards and storage devices for cooling purposes.

6. The high speed mass storage system of claim 1 wherein the storage devices are disk drives and the storage device bypass circuit boards are disk drive bypass circuit boards each having a connector to receive a disk drive.

7. The high speed mass storage system of claim 6 wherein each said mass storage module includes a disk drive bypass circuit board connector for each of the drive bypass circuit boards with an opening between each connector to permit the flow of air between the connectors, and wherein each drive bypass circuit board is a relatively flat circuit board with a connector on opposite edges, wherein one of the connectors is the connector which receives the disk drive and the other connector connects to said drive bypass circuit board connector, said connectors, bypass circuit boards and drives being arranged such that when they are connected there is a path for air flow from outside the module alongside each bypass circuit board and its associated disk drive for cooling purposes without any backplane obstruction.

8. The high speed mass storage system of claim 7 wherein each said mass storage module is housed in an enclosure and at least one fan is mounted to force air from outside said enclosure through the spaces between said bypass boards and drives.

9. The high speed mass storage system of claim 1 wherein the controller operates with a Fibre Channel protocol.

10. The high speed mass storage system of claim 1 wherein the controller is an arbitrated dual channel Fibre Channel controller.

11. The high speed mass storage system of claim 9 wherein each storage device is a disk drive and wherein each storage device bypass circuit board comprises a disk drive bypass circuit board including a circuit which completes the connection of the at least one first computer or the at least one second computer with the other drive bypass circuits and their associated disk drives whether or not the disk drive is present.

12. The high speed mass storage system of claim 11 wherein the module bypass circuit board outputs electrical signals from each said mass storage module via the optical input/output connector when light signals are received by said optical input/output connector.

13. The high speed mass storage system of claim 11 wherein each said mass storage module includes a disk drive bypass circuit board connector for each of the disk drive bypass circuit boards with an opening between each connector to permit the flow of air between the connectors, and wherein each disk drive bypass circuit board is a relatively flat circuit board with a connector on opposite edges, wherein one of the connectors is the connector which receives the disk drive and the other connector connects to said disk drive bypass circuit board connector, said connectors, bypass circuit boards and drives being arranged such that when they are connected there is a path for air flow from outside each said mass storage module alongside each bypass circuit board and its associated disk drive for cooling purposes without any backplane obstruction.

14. The high speed mass storage system of claim 13 wherein each said mass storage module is housed in an enclosure and at least one fan is mounted to force air from outside said enclosure through the spaces between said bypass boards and drives.

15. The high speed mass storage system of claim 10 wherein the storage devices are disk drives and the storage device bypass circuit boards are disk drive bypass circuit boards, and wherein the at least one module includes a disk drive bypass board connector for each of the disk drive bypass circuit boards with an opening between each connector to permit the flow of air between the connectors and alongside the bypass circuit boards and disk drives for cooling purposes.

16. The high speed mass storage system of claim 1 wherein each of said module bypass circuit boards of said first and second mass storage modules include first and second electronic switches, each of said first and second electronic switches including input and output electrical connections to said first and second controllers, each of said first and second electronic switches including input and output electrical connections to said optical input/output connector, and a signal detect output produced by said optical input/output connector being connected to each of said first and second electronic switches to control switching of said first and second electronic switches to alternatively route signals from and to said first and second controllers to and from a corresponding one of said first and second mass storage modules, or to bypass said corresponding one of said first and second mass storage modules.

17. A high speed mass storage system adapted to be readily expandable to increase its capacity while the system is in operation comprising:
   a first server including a first controller and at least one first computer connected in communication with said first controller, each said at least one first computer including at least one CPU;
   a second server including a second controller and at least one second computer connected in communication with said second controller, each said at least one second computer including at least one CPU;
   first and second mass storage modules each including:
   (a) a plurality of plug-in disk drives for storing information;
   (b) a disk drive bypass circuit board associated with each disk drive and including a disk drive connector at one edge thereof and a bypass board connector at another edge thereof, each disk drive being plugged into said disk drive connector on the disk drive bypass circuit board, each of said disk drive bypass circuit boards of said first and second mass storage modules including first and second electronic switches, each of said first and second electronic switches including input and output electrical connections to said first and second controllers, respectively, each of said first and second electronic switches including input and output electrical connections to a corresponding one of said plug-in disk drives, and a fault signal output produced by said corresponding one of said plurality of disk drives being connected to each of said first and second electronic switches to control switching of said first and second electronic switches to alternatively route signals from and to said first and second controllers to and from said corresponding one of said plurality of disk drives, or to bypass said corresponding one of said plurality of disk drives;
   (c) a module bypass circuit board including an optical input/output connector for outputting electrical signals from the module as light signals and for inputting light signals into the module as electrical signals, and wherein the optical input/output connectors of the module bypass circuit boards of the first and second mass storage modules are connected by a fiber optic transmission medium such that signals are communicated between the modules in the form of light, each of said module bypass circuit boards of said first and second mass storage modules including first and second electronic switches, each of said first and second electronic switches including input and output electrical connections to said first and second controllers, respectively, each of said first and second electronic switches including input and output electrical connections to said optical input/output connector, and a signal detect output produced by said optical input/output connector being connected to each of said first and second electronic switches to control switching of said first and second electronic switches to alternatively route signals from and to said first and second controllers to and from a corresponding one of said first and second mass storage modules, or to bypass said corresponding one of said first and second mass storage modules;

said first controller connecting the at least one first computer of the first controller with each said disk drive through its associated drive bypass circuit board and through the module bypass circuit board such that a loop is formed between the output and input of the first controller with each disk drive bypass circuit board and the module bypass circuit board in said loop and completing said loop whether or not a disk drive is plugged into the disk drive connector; and said second controller connecting the at least one second computer of the second controller with each said disk drive through its associated drive bypass circuit board and through the module bypass circuit board; and at least one of said first and second servers being operative to establish direct communication between the first and second controllers, and said first and second controllers being operative to maintain direct communication between the first and second controllers independent of said at least one first computer of said first server and said at least one second computer of said second server.

18. The high speed mass storage system of claim 17, wherein said module bypass circuit board of said first mass storage module completes said loop through the second module.

19. The high speed mass storage system of claim 17 wherein the module bypass circuit board outputs electrical signals from each said mass storage module via the optical input/output connector when light signals are received by said optical input/output connector.

20. The high speed mass storage system of claim 17 wherein the module bypass circuit board of each said mass storage module outputs electrical signals from the first mass storage module to the second mass storage module via the optical input/output connector when light signals are received from the second mass storage module by said optical input/output connector.

21. The high speed mass storage system of claim 17 wherein each said mass storage module includes a drive bypass board connector for each of the drive bypass circuit boards with an opening between each connector to permit the flow of air between the connectors and alongside the bypass circuit boards and disk drives for cooling purposes.

22. The high speed mass storage system of claim 17 wherein each said mass storage module includes a drive bypass circuit board connector for each of the drive bypass circuit boards, and wherein each drive bypass circuit board is a relatively flat circuit board with a connector on opposite edges, wherein one of the connectors is the connector which receives the disk drive and the other connector connects to said drive bypass circuit board connector, said connectors, bypass circuit boards and drives being arranged such that when they are connected there is a path for air flow from outside each said mass storage module alongside each bypass circuit board and its associated disk drive for cooling purposes without any backplane obstruction.

23. The high speed mass storage system of claim 22 wherein each said mass storage module is housed in an enclosure and at least one fan is mounted to force air from outside said enclosure through the spaces between said bypass boards and drives.

24. The high speed mass storage system of claim 23 wherein each drive bypass circuit board connector is mounted in the same plane in spaced relationship with each other.

25. The high speed mass storage system of claim 17 wherein the controller operates with a Fibre Channel protocol.

26. The high speed mass storage system of claim 17 wherein the controller is an arbitrated dual channel Fibre Channel system.

27. The high speed mass storage system of claim 26 wherein each drive bypass circuit board completes the connection of the at least one first computer or the at least one second computer with the other drive bypass circuits and their associated disk drives whether or not the disk drive is present.

28. The high speed mass storage system of claim 26 wherein the module bypass circuit board outputs electrical signals from each said mass storage module via the optical input/output connector when light signals are received by said optical input/output connector.

29. The high speed mass storage system of claim 26 wherein each said mass storage module includes a drive bypass board connector for each of the drive bypass circuit boards with an opening between each connector to permit the flow of air between the connectors and alongside the bypass circuit boards and disk drives for cooling purposes.

30. The high speed mass storage system of claim 26 wherein each said mass storage module includes a drive bypass circuit board connector for each of the drive bypass circuit boards with an opening between each connector to permit the flow of air between the connectors, and wherein each drive bypass circuit board is a relatively flat circuit board with a connector on opposite edges, wherein one of the connectors is the connector which receives the disk drive and the other connector connects to said drive bypass circuit board connector, said connectors, bypass circuit boards and drives being arranged such that when they are connected there is a path for air flow from outside each said mass storage module alongside each bypass circuit board and its associated disk drive for cooling purposes without any backplane obstruction.

31. The high speed mass storage system of claim 30 wherein each said mass storage module is housed in an enclosure and at least one fan is mounted to force, air from outside said enclosure through the spaces between said bypass boards and drives.

* * * * *